United States Patent
Birek et al.

(10) Patent No.: US 10,889,199 B2
(45) Date of Patent: Jan. 12, 2021

(54) DETERMINING A CHARGING REQUIREMENT FOR AN ENERGY STORAGE MEANS OF A VEHICLE

(71) Applicant: JAGUAR LAND ROVER LIMITED, Coventry (GB)

(72) Inventors: Lech Andrzej Birek, Warwickshire (GB); Krzysztof Kobylinski, Warwickshire (GB); James Aggiss, Warwickshire (GB); Navneesh Phillip, Warwickshire (GB); Prasun Chokshi, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 246 days.

(21) Appl. No.: 16/182,312

(22) Filed: Nov. 6, 2018

(65) Prior Publication Data

US 2019/0143831 A1    May 16, 2019

(30) Foreign Application Priority Data

Nov. 13, 2017 (GB) .................................. 1718716.2

(51) Int. Cl.
| | | |
|---|---|---|
| *B60L 58/12* | (2019.01) | |
| *B60L 58/14* | (2019.01) | |
| *B60L 53/64* | (2019.01) | |
| *B60L 3/12* | (2006.01) | |
| *B60L 53/10* | (2019.01) | |

(52) U.S. Cl.
CPC ................. *B60L 58/12* (2019.02); *B60L 3/12* (2013.01); *B60L 53/11* (2019.02); *B60L 53/64* (2019.02); *B60L 58/14* (2019.02); *B60L 2240/622* (2013.01); *B60L 2240/72* (2013.01); *B60L 2240/80* (2013.01); *B60L 2250/16* (2013.01);
(Continued)

(58) Field of Classification Search
None
See application file for complete search history.

(56) References Cited

U.S. PATENT DOCUMENTS 9,333,872 B2 * 5/2016 Maya .................. B60L 11/1861
10,137,795 B2 * 11/2018 Petrosian .............. B60L 53/305
(Continued)

FOREIGN PATENT DOCUMENTS

| DE | 102011104153 A1 | 6/2011 |
| DE | 102010031544 A1 | 1/2012 |

(Continued)

OTHER PUBLICATIONS

Search and Examination Report, GB1718716.2, dated May 15, 2018, 6 pp.

*Primary Examiner* — Todd Melton
(74) *Attorney, Agent, or Firm* — Miller Nash Graham & Dunn LLP

(57) ABSTRACT

A method for determining a charging requirement for an energy storage means of a vehicle can include: determining a routine of use of charge of the energy storage means; predicting a future use of charge of the energy storage means based on the routine; determining a charging requirement for the energy storage means based on the prediction; and providing an output to a user of the vehicle indicative of a time at which an increase in the state of charge of the energy storage means will be required based on the determined charging requirement.

20 Claims, 3 Drawing Sheets

(52) U.S. Cl.
CPC ....... *B60L 2260/52* (2013.01); *B60L 2260/54* (2013.01)

(56) References Cited

U.S. PATENT DOCUMENTS

| | | | |
|---|---|---|---|
| 10,286,801 B2* | 5/2019 | Shimizu | G07F 15/005 |
| 2011/0282527 A1 | 11/2011 | Inbarajan et al. | |
| 2012/0326724 A1 | 12/2012 | Park | |
| 2014/0316939 A1* | 10/2014 | Uyeki | B60L 53/67 |
| | | | 705/26.9 |
| 2014/0336965 A1 | 11/2014 | Mori et al. | |
| 2018/0257473 A1* | 9/2018 | Follen | B60K 6/22 |

FOREIGN PATENT DOCUMENTS

| | | |
|---|---|---|
| DE | 102013200831 A1 | 1/2013 |
| DE | 102015113264 A1 | 2/2016 |

* cited by examiner

DETERMINING A CHARGING REQUIREMENT FOR AN ENERGY STORAGE MEANS OF A VEHICLE

CROSS REFERENCE TO RELATED APPLICATION

This application claims priority to and the benefit of GB Patent Application No. 1718716.2 filed Nov. 13, 2017, the content of which is incorporated by reference herein in its entirety.

TECHNICAL FIELD

The present disclosure relates to determining a charging requirement for an energy storage means of a vehicle. In particular, but not exclusively it relates to determining a charging requirement for an energy storage means of an electric vehicle.

Aspects of the invention relate to a method, a controller, a vehicle system, a vehicle and a computer program.

BACKGROUND

It is known that some vehicles (e.g. electric vehicles) comprise a gauge or other visual indicator that displays a current state of charge of an energy storage means (e.g. traction battery) of the vehicle. From this, a vehicle user can estimate the remaining range of the vehicle.

It is also known that some vehicles comprise a gauge or other visual indicator that displays the distance (range) that the vehicle can drive based on the current state of charge. However, the range displayed in some vehicles may not be reliable, especially when the state of charge is low.

Some electric vehicles have traction batteries that provide relatively low vehicle ranges as compared to internal combustion engine (ICE) powered vehicles, and can only charge at a relatively slow rate, taking several hours to fully charge. The charging infrastructure in some areas is scarce compared to petrol/gasoline or diesel fueling infrastructure. These issues can create range anxiety among electric vehicle users, compounded by a strong incentive to only charge at home or at work rather than in the middle of a journey, for example.

There is considerable scope for addressing these challenges considering that a state of charge indicator is the user's primary means of determining a vehicle's remaining range.

It is an aim of the present invention to address disadvantages of the prior art.

SUMMARY

Aspects and embodiments of the invention provide a method, a controller, a vehicle system, a vehicle and a computer program as claimed in the appended claims.

According to an aspect of the invention there is provided a method for determining a charging requirement for an energy storage means of a vehicle, the method comprising: determining a routine of use of charge of the energy storage means; predicting what the state of charge of the energy storage means will be at completion of an event in dependence on the routine, wherein the event is a defined time period and/or distance of future driving of the vehicle; determining a charging requirement for the energy storage means in dependence on the prediction; providing an output to a user of the vehicle indicative of a time at which an increase in the state of charge of the energy storage means will be required in dependence on the determined charging requirement; and providing an affirmative or negative output to the user in dependence on the charging requirement, wherein the affirmative output indicates that an increase in the state of charge of the energy storage means will not be required for completing the event in dependence on the predicted state of charge at completion of the event not being in a charge-depleted state, wherein the negative output indicates that an increase in the state of charge of the energy storage means will be required for completing the event in dependence on the predicted state of charge at completion of the event being in a charge-depleted state, and wherein when the affirmative or negative output is provided is dependent on one or more of: the vehicle entering a key-on state; a departure location; a pre-determined departure time; or a pre-determined time of day.

According to some, but not necessarily all examples of the disclosure there is provided a method for determining a charging requirement for an energy storage means of a vehicle, the method comprising: determining a routine of use of charge of the energy storage means; predicting a future use of charge of the energy storage means in dependence on the routine; determining a charging requirement for the energy storage means in dependence on the prediction; and providing an output to a user of the vehicle indicative of a time (e.g. day, time of day etc.) at which an increase in the state of charge of the energy storage means will be required in dependence on the determined charging requirement. In some examples, the output indicative of a time indicates a day on which the increase in the state of charge of the energy storage means will be required.

This provides the advantage of reducing range anxiety for the user, because the method learns the users personalized routine energy needs, to inform the user about the expected time (particularly day) on which the energy storage means will require charging.

In some examples, predicting a future use of charge is for a defined time period and/or distance of future driving of the vehicle, resulting in a prediction of what the state of charge of the energy storage means will be at completion of the defined time period and/or distance.

This provides the advantage of enabling affirmative or negative outputs to be provided to the user which indicate whether the vehicle can be driven to a target destination, or for a target distance, or for a target duration.

In some examples, the method comprises providing an affirmative output to the user indicating that an increase in the state of charge of the energy storage means will not be required for driving for the defined time period and/or distance in dependence on the predicted state of charge at completion of the defined time period and/or distance not being in a charge-depleted state. In some examples, the method comprises providing the affirmative output within a predetermined period of time from the vehicle entering a key-on state and/or within a predetermined distance from a location at which the vehicle entered a current key-on state. The predetermined time may be a value less than one minute or less than 30 seconds or less than 10 seconds, for example. The predetermined distance may be a value less than 1 kilometre or less than 100 metres or less than 10 metres, for example.

This provides the advantage that the user will be reassured when they have enough charge to complete their routine journeys ahead, for example when their vehicle has enough "charge for today".

In some examples, the method comprises providing a negative output indicating that an increase in the state of charge of the energy storage means will be required for driving for the defined time period and/or distance in dependence on the predicted state of charge at completion of the defined time period and/or distance being in a charge-depleted state. In some examples, the negative output is provided within a predetermined period of time from the vehicle entering a key-on state and/or within a predetermined distance from a location at which the vehicle entered a current key-on state. The predetermined time may be a value less than one minute or less than 30 seconds or less than 10 seconds, for example. The predetermined distance may be a value less than 1 kilometre or less than 100 metres or less than 10 metres, for example.

This provides the advantage that the user will be reassured that they will receive a warning at an opportune moment before committing to a journey that will require a charging at an inconvenient time and/or place.

In some examples, the routine is determined using measurements of the state of charge of the energy storage means recorded with respect to a cyclic calendar-based time interval. In some examples, the routine is determined using measurements of the distance travelled by the vehicle, recorded with respect to the cyclic calendar-based time interval.

This provides the advantage of enabling accurate determinations of the routine to be made, because the user of the vehicle is mostly likely to follow a cyclic calendar-based driving routine, e.g. similar commuting patterns from week to week.

In some examples, the method comprises providing a charge reminder output recommending charging of the energy storage means in dependence on the prediction indicating that the state of charge of the energy storage means will be in a charge depleted state at a time when and/or at a place where the vehicle is not routinely charged. In some examples, the method comprises: providing the charge reminder output upon determining that the vehicle approaching a location where the energy storage means has previously been charged and/or where the vehicle has previously been left in a key-off state for longer than a predetermined threshold length of time.

This provides the advantage that the user will be reassured that they will receive a well-timed warning that they should charge their vehicle at an upcoming convenient time and/or place, to avoid later having to charge at an inconvenient time and/or place.

In some examples, the method comprises: providing a charging location output indicative of one or more charging locations within a threshold proximity of a destination of the vehicle. In some examples, the charging location output is indicative of at least one charging location where the energy storage means has not previously been charged, in dependence on the at least one charging location being associated with one or more of the following properties: charger type; charger compatibility; availability of the charger; charge rate of the charger; cost to charge using the charger; data indicating that the user or the vehicle is authorised to use the charger; or a user-assigned preference.

This provides the advantage that the user will be recommended a most-appropriate or relevant charging location should they need (or want) to charge their vehicle. It would also be beneficial to provide the charging location output following the negative output or the charge reminder output.

According to some, but not necessarily all examples of the disclosure there is provided a method for determining an out-of-routine charging requirement for an electric or hybrid electric vehicle, the method comprising: determining a routine of electrical charge and discharge for driving the vehicle under electric power; predicting expected electrical charge and discharge for driving the vehicle under electric power in dependence on the routine; and causing, at least in part, an output to be provided to a user of the vehicle indicating whether the vehicle will require an out-of-routine charge assuming the predicted expected electrical discharge.

According to some, but not necessarily all examples of the disclosure there is provided a method for determining a charging requirement for an energy storage means of a vehicle, the method comprising: determining a routine of use of charge of the energy storage means; predicting a future use of charge of the energy storage means in dependence on the routine; and determining a charging requirement for the energy storage means in dependence on the prediction.

According to some, but not necessarily all examples of the disclosure there is provided a method for determining a charging requirement for an energy storage means of a vehicle, the method comprising: determining a routine of use of charge of the energy storage means; predicting a future use of charge of the energy storage means in dependence on the routine; determining a charging requirement for the energy storage means in dependence on the prediction; and providing an output to a user of the vehicle indicative of a time and/or location at which an increase in the state of charge of the energy storage means will be required in dependence on the determined charging requirement.

According to another aspect of the invention there is provided a controller comprising means for carrying out any one or more of the methods described herein. The means may comprise: at least one electronic processor; and at least one electronic memory device electrically coupled to the electronic processor and having instructions stored therein, the at least one electronic memory device and the instructions configured to, with the at least one electronic processor, cause a vehicle system at least to perform any one or more of the methods described herein.

According to an aspect of the invention there is provided a controller for determining a charging requirement for an energy storage means of a vehicle, the controller comprising:
input means for receiving data indicative of a use of charge of the energy storage means;
processing means configured to:
determine a routine of use of charge of the energy storage means in dependence on the received data;
predict a future use of charge of the energy storage means in dependence on the determined routine; and
determine a charging requirement for the energy storage means in dependence on the prediction; and
output means for providing an output to a user of the vehicle indicative of a time at which an increase in the state of charge of the energy storage means will be required in dependence on the determined charging requirement. The input means may comprise an input device. The processing means may comprise at least one electronic processor. The output means may comprise an output device.

According to a further aspect of the invention there is provided a vehicle system comprising a controller according to any preceding aspect of the invention, and at least one output device, wherein the output device is configured to receive the provided output, and to present the output to a user.

According to a further aspect of the present invention there is provided a vehicle comprising a controller or vehicle system as described in any of the preceding aspects of the invention.

According to a further aspect of the present invention there is provided a computer program that, when run on at least one electronic processor, causes a controller to perform any one or more of the methods described herein.

According to a further aspect of the present invention there is provided a non-transitory computer readable medium having instructions stored therein that, when run on at least one electronic processor, causes a controller to perform any one or more of the methods described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION OF THE EMBODIMENTS

Figure 1:
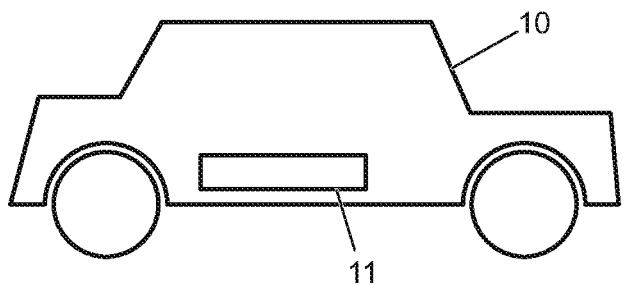
FIG. 1 illustrates an example of a vehicle.

FIG. 1 illustrates an example of a vehicle 10 in which embodiments of the invention can be implemented. In some, but not necessarily all examples, the vehicle 10 is a passenger vehicle, also referred to as a passenger car or as an automobile. Passenger vehicles generally have kerb weights of less than 5000 kg. In other examples, embodiments of the invention can be implemented for other applications, such as industrial vehicles, air or marine vehicles.

The vehicle 10 of FIG. 1 comprises energy storage means 11 and a traction motor (not shown). The motor is configured to convert energy stored within the energy storage means 11 into energy for providing tractive force for propelling the vehicle 10. In some, but not necessarily all examples the energy storage means 11 is a traction battery ('battery' herein), and the motor is an electric motor. The vehicle 10 may be an electric vehicle, i.e. a hybrid electric vehicle or an all-electric vehicle.

In some, but not necessarily all use cases based on the following disclosure there is provided a self-learning electric vehicle 10 feature which learns a user's personalized daily routine energy needs, so is able to provide one or more of the following:

An output informing the user about the expected day or time of day and/or location at which the battery 11 will require charging, extrapolating from their current battery state of charge;

An affirmative or negative output informing the user that the state of charge of the battery 11 is, for example, "sufficient for your typical day", or that "I recommend you charge today", or "you do not have enough battery charge for your typical day", or that the state of charge is sufficient for one or more predicted future journeys, based on their typical routine;

A charge reminder output informing the user of the most convenient time to charge, on the basis of a prediction that the battery 11 has enough charge for today or for one or more predicted future journeys but not enough for a future day or at a time of day when it will be inconvenient to charge;

A charging location output informing the user of the most convenient place to charge based on ideal charging locations.

Figure 2:
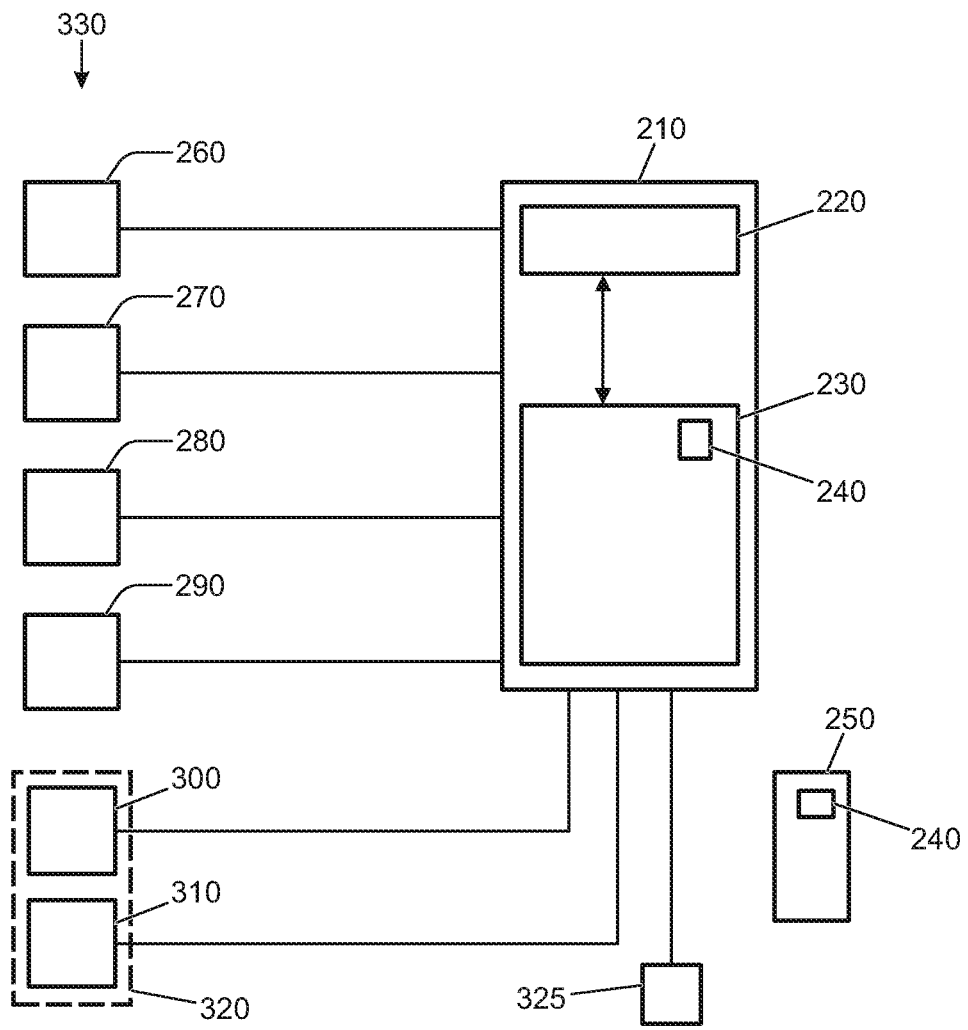
FIG. 2 illustrates an example of a controller and an example of a vehicle system.

FIG. 2 illustrates an example controller 210 and an example vehicle system 330, configured to enable various aspects and embodiments of the invention to be performed. It would be appreciated that other arrangements from that of FIG. 2 are possible.

The vehicle system 330 comprises a plurality of subsystems and monitors, each of which is operably coupled with the controller 210. In some examples, monitors may be implemented as control logic within the controller 210. Example subsystems and monitors, illustrated in FIG. 2, include:

A state of charge monitor 260, for providing data indicative of a current state of charge of the battery 11. The state of charge monitor 260 or the controller 210 may be configured to determine a history of the state of charge of the battery 11. This functionality could be embedded within a control module integrated or associated with the battery 11, for example.

An optional key-on/key-off monitor 270, for providing data indicative of whether the vehicle 10 is currently in a key-on or in a key-off state. This functionality could be embedded within a powertrain control unit, for example. In accordance with the ordinary definitions of key-on and key-off, a vehicle 10 entering a key-on state means that a user has operated their vehicle key such that the vehicle 10 is operable to produce tractive force in response to depression of its acceleration pedal. A vehicle 10 entering a key-off state means that a user has operated their vehicle key such that the vehicle 10 is unable to produce tractive force in response to depression of its acceleration pedal.

An optional user-selectable subsystem usage monitor 280, for providing data indicative of which user-selectable energy-consuming subsystems are in use and of the rate of energy consumption of each user-selectable subsystem. Examples of monitored user-selectable subsystems include an air conditioning system, an infotainment system, a vehicle interior lighting system, etc. This functionality could be embedded within a control unit receiving information from one or more power consumption sensors associated with each of the user-selectable subsystems, for example.

An optional navigation system 290, for providing data indicative of one or more of: a current geographical location of the vehicle 10; route information; points of interest such as charging locations at which charging stations are located, etc. The navigation system 290 may comprise a Global Positioning System (GPS) or the like. The data indicative of charging locations may be augmented with metadata indicating properties of the charging station, such as a charge rate or compatibility information. The controller 210 could be configured to retrieve the metadata from one or more remote computing means, such as an external server, in dependence on data from the navigation system 290.

An output device 300. In some examples, the output device 300 is configured to present an output to a user of the vehicle 10. The output device 300 may be an audio output device and/or a visual output device. In other examples, the output device 300 may not be part of the vehicle system 330 and may instead be a portable user device such as a mobile telephone, a so-called 'smart' watch, or similar portable media devices, able to communicate with the controller 210 of the vehicle 10. This enables a portable user device to present the output to the user, even if the user is remote from the vehicle 10.

An optional input device 310 (e.g. button, touchscreen) for enabling a user to make inputs in response to user-input prompts presented by the output device 300. The input and output devices may together form a human-machine interface 320.

An optional distance measuring subsystem 325 such as an odometer.

The vehicle system 330 may comprise any one or more of the above subsystems, and other subsystems not in the above list operably coupled with the controller 210. The controller 210 is configured to receive the respective data from and/or transmit commands to the subsystems of the vehicle system 330. In some examples, the controller 210 is embodied within the vehicle 10 as part of the vehicle system. In other examples, the controller 210 is remote from the vehicle 10. The data can be exchanged one or more vehicle buses, such as via a Controller Area Network (CAN) bus, and/or via an interface for vehicle-external communication (e.g. wireless interface).

For purposes of this disclosure, it is to be understood that controller(s) described herein can each comprise a control unit or computational device having one or more electronic processors. See for example FIG. 2 which shows a control unit having an electronic processor 220; and at least one electronic memory device 230 electrically coupled to the electronic processor 220 and having instructions 240 stored therein. A vehicle 10 and/or a system thereof (such as the controller 210) may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

Aspects and embodiments of the invention can alternatively be embodied as computer program code 240 stored on a computer readable storage medium 250, as also illustrated in FIG. 2.

Figure 3:
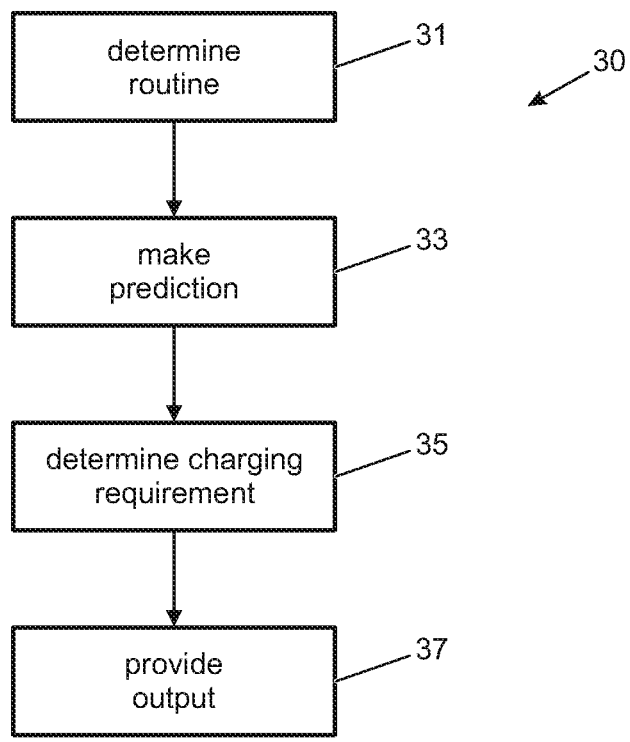
FIG. 3 illustrates an example of a method.

FIG. 3 illustrates a method 30 for determining a charging requirement for the battery 11 of the vehicle 10 described in relation to FIG. 1. The controller 210 of FIG. 2 may be configured to perform the method 30.

The method 30 comprises, at block 31, determining a routine of use of charge of the battery 11.

In some examples, determining a routine at block 31 comprises continually collecting data indicative of a current state of charge (SoC) of the battery 11 to determine a history of SoC. The controller 210 could be configured to obtain such data from the state of charge monitor 260, for example.

A "routine" refers to an established course of procedure, therefore the data collection begins significantly earlier than a most-recent charging event of the battery 11. For example, the data collection may be 'cradle-to-grave' data collection, i.e. may operate continually over the whole lifespan of the vehicle 10.

A "routine" more specifically also refers to a repetitive procedure, therefore in one example determining the routine at block 31 may comprise continuously collecting the data throughout a cyclic calendar-based routine. Data collection may be performed in accordance with known machine learning techniques such as nearest neighbour regression and/or ensemble learning, for example, although other machine learning techniques are envisaged. Each cycle for which the data is collected increases the performance of any predictions made based on the determined routine, because the accuracy of an expected use of SoC metric (e.g. average) and of an associated error/confidence score (e.g. variance) increases.

Regarding the time interval of the cyclic calendar-based routine, different users operate their vehicles according to different routines. A 'weekly' routine may be appropriate to those users who have similar driving patterns from one week to the next. A user whose driving habits are determined by a fortnightly shift pattern for their place of work may operate on a 'fortnightly' routine. Other time intervals include 'daily' or 'monthly'. In some examples, the state of charge data with respect to a weekly routine may be at day-level granularity.

In some, but not necessarily all examples, the determined routine is, in effect, a model of SoC over time from which predictions can be made indefinitely into the future with a certain level of confidence, assuming of course that the conditions affecting the learning of the routine do not radically change in the future (e.g. user changes job, moves house etc.).

In some, but not necessarily all examples, collected data on which the routine is based reveals not only decreases but also increases in SoC, each increase representing a period when the battery 11 is plugged in or otherwise coupled at a charging location (charging station) so the vehicle 10 (more specifically, the battery 11) is charging. This is true at least of examples in which the routine is a model of SoC over time. The SoC may also increase during a journey in which more energy is recovered via regenerative braking than is expended in propelling the vehicle, as may occur when driving downhill.

The controller 210 could be configured to positively determine an increase in SoC to be a charging event, for example in dependence on detection of an increase in SoC above a threshold increase in SoC within a given time interval.

In view of the restricted rate of charge of electric vehicle traction batteries, users will generally try to charge when they visit locations for at least a few hours, where a charging station is available. For example, many users charge their vehicles overnight at home using a home charging station. Some users routinely charge their vehicles at work using a work charging station. The determined routine based on such behaviour would reveal with a high degree of certainty at what days and/or times of day in the cycle the vehicle is expected to be charged, and/or at what locations the vehicle is expected to be charged, using current or historic information from the navigation system 290. In an illustrative example, the routine reveals that the vehicle 10 is routinely charged at a particular charging station on a particular day of the week.

In some, but not necessarily all examples, determining the routine at block 31 further comprises determining a routine of usage of user-selectable energy-consuming vehicle subsystems, for example using data from the user-selectable subsystem usage monitor 280. This would enable the discrimination of energy consumption purely for producing tractive force from energy consumption for other purposes. This increases predictive performance of any predictive model based on the routine, because a prediction of SoC can then account for the likelihood of use of user-selectable subsystems.

In some, but not necessarily all examples, algorithms for the routine determination are trainable. For example, the routine determination comprises weighting SoC data according to age, so that the average is computed based on weighted SoC data. Older SoC data may be given a lower weight. This ensures that the determined routine quickly adjusts to changes in the user's routine, for example when the user moves house, and even to changes of season, for example accounting for increased use of air conditioning.

In some, but not necessarily all examples, the controller 210 is configured to determine whether the vehicle 10 is being driven out-of-routine. This determination can be made, for example, by making an internal prediction of expected distance to be travelled in a given day, using historic distance data collected from the distance measuring subsystem 325, and an internal prediction of expected SoC to be consumed in a given day. If on a given day, the user travels than they are expected to travel, by a certain threshold, then the output device 300 prompts the user to confirm whether they are driving out-of-routine. If the user confirms this with an input via the input device 310, the data for that day is discarded. Discarded data is not taken into account in updating the routine.

In some, but not necessarily all examples, when the user has confirmed that they are out-of-routine for a given day, the method discards all new data associated with block 31 until the user is back on their normal routine. Once user is out-of-routine for a given time interval such as a day, all data for that time interval will be discarded until completion of the time interval.

In some, but not necessarily all examples, when the method detects that the user is out-of-routine, the output device 300 prompts the user to confirm whether they are driving out-of-routine or whether the driving is in accordance with a new routine. If the user confirms that the present driving is in accordance with a new routine, the system may perform one or more of: using rather than discarding the relevant data; discarding an existing routine, or otherwise reducing the influence that an existing routine has on any future predictions.

At block 33, the method 30 comprises predicting a future use of charge of the battery 11 in dependence on the routine. At block 35, the method 30 comprises determining a charging requirement for the battery 11 in dependence on the prediction.

In one example implementation, blocks 33 and 35 determine when a next charge-depleted state of the battery 11 is expected to occur. A charge-depleted state may refer to SoC being below a reserve level of SoC (e.g. 25%), or being insufficient for driving a lower threshold of distance (e.g. 50 miles) or for a next journey. The battery 11 requires charging when the battery 11 is in a charge-depleted state. In the charge-depleted state the battery 11 may still be usable for providing tractive torque, but a warning may be output to the user via an output device (e.g. 300) indicative of the charge-depleted state.

In some, but not necessarily all examples, the threshold for a depleted state is adjustable. For example, the controller 210 could be configured to set the threshold as a variable rather than a constant, varying in dependence on the time (e.g. day) within the cycle (e.g. week). The threshold setting may be dependent on the available SoC of the battery 11. The threshold setting may be dependent on confidence/error (e.g. variance) metrics of the routine data, or in dependence on typical distance travelled at different points in the cycle. For example, if the user drives to different destinations every Saturday, the threshold could be set to 20% SoC for Saturdays. If the user drives to the same destinations at the same times every Friday, a reserve level of 10% SoC may be appropriate for Friday.

In some, but not necessarily all examples, the prediction is for a defined time period and/or distance of future driving of the vehicle 10, resulting in a prediction of what the SoC will be at completion of the defined time period and/or distance of future driving. A defined time period could be 'today'.

As a default, the controller 210 may perform the prediction for the defined time period automatically without the need for any user input, so that the method is performed at least once a day for example. The controller 210 could be configured such that if a user enters a destination into the navigation system 290, the controller 210 determines the defined distance for reaching the destination from a starting (e.g. current) location of the vehicle 10 and takes this into account.

For a defined time period and/or distance of future driving, the prediction may provide an indication of whether the defined time period and/or distance can be completed without the battery 11 reaching the depleted state.

In an illustrative example, the prediction tests the hypothesis "Is there enough charge for today?", based on the routine, where today is the defined time period. This may for example be tested by subtracting the predicted SoC at the end of the day from a current SoC of the battery 11. If the answer is yes, then the battery 11 is expected not to reach the depleted state today assuming average use of charge today. If the answer is no, then the battery 11 is expected to reach the depleted state today assuming average use of charge today.

At block 37, the method 30 comprises providing an output to the user indicative of a time (e.g. day, time of day) at which an increase in the SoC of the battery 11 will be required in dependence on the determined charging requirement. If the controller 210 carrying out the method 30 does not itself comprise the output device 300, block 37 may consist of transmitting information to the output device 300 to cause, at least in part, the presentation of the above-mentioned output to the user.

The user is therefore informed via the output device 300 or other display device displaying the output (and/or listening to an audio device, etc), that based on the routine they will not need to charge their vehicle 10 until the indicated time.

The output accounts for periods in which the vehicle 10 is expected to be key-off according to the routine. For example, if over the next two days the vehicle 10 will be key-off for the whole of the first day according to the routine, then will be driven on the second day until a charge is required according to the routine, the output indicates that the vehicle 10 has two days until the next charging requirement.

The time may be expressed solely at day/date-level granularity. For example, the output may indicate a need to charge on 'Wednesday'. In other examples, the time may be expressed partially or solely at time-of-day-level granularity: a need to charge by '5 pm'.

An output presented based on the method 30 has advantages over an output presented by a conventional charge gauge which monitors current SoC. A conventional gauge only predicts how much charge is left, or how far the vehicle 10 can travel while key-on, but is unable to indicate how long the vehicle 10 can be used for without recharge. For example, a gauge indicating only 25% SoC or 80 miles may cause range anxiety, whereas if the 25% is sufficient for four days of routine driving (accounting for key-off periods) before a charging requirement, a reassuring time-based output would reduce range anxiety.

In some, but not necessarily all examples, the above-mentioned output can be presented on an output device 300 or as part of a system of output devices that present additional useful information to the user.

Figure 5:
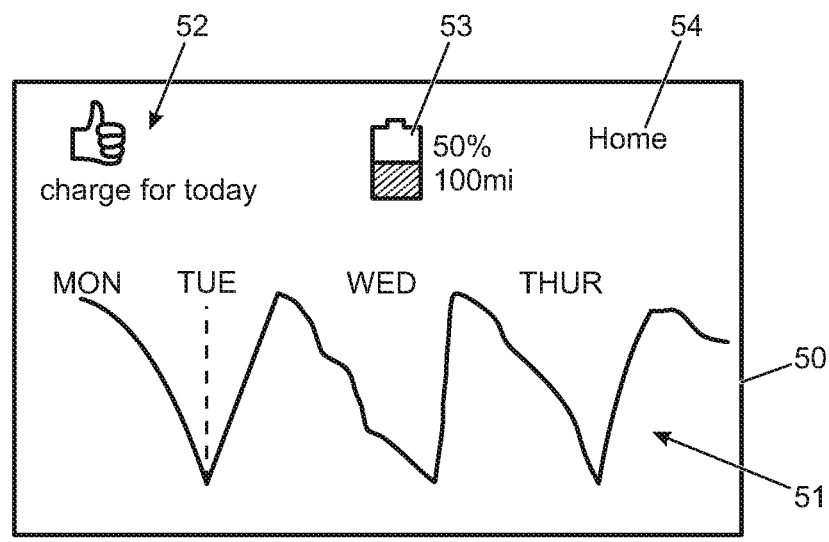
FIG. 5 illustrates an example of a user interface.

FIG. 5 shows an illustrative example of a user interface 50.

The user interface of FIG. 5 shows a representation of the prediction as a SoC-time line graph 51. The x-axis presents time labelled as days. The x-axis extends two weeks ahead. The y-axis represents SoC. The line represents the average of SoC from the routine determination process. The output is provided by the graph itself which shows that the next charging requirement occurs on Tuesday. In other examples, the output of block 37 could be represented by an icon aligned with a particular day of the week. In other examples, the controller 210 could be configured to present the output in other forms such as a text-based message, a visual gauge, or an audio message.

The user interface of FIG. 5 additionally has a region 52 for showing affirmative outputs and negative outputs, based on a calculation of blocks 33 to 37 for a defined time and/or distance of future driving. The region 52 is shown in FIG. 5 as presenting an affirmative output in the form of a thumbs-up icon adjacent the text 'charge for today'. This indicates that the user has enough charge for today without reaching a charge-depleted battery state. If for a defined distance of future driving based on a destination input by the user, the affirmative output may take the form 'charge for reaching destination' next to a thumbs-up symbol.

However, if blocks 33 and 35 were to indicate that the defined time period and/or distance of future driving cannot be completed without the battery 11 reaching a charge-depleted state, an appropriate form for the negative output could be a thumbs-down icon rather than the thumbs-up icon of the affirmative output shown in FIG. 5.

Of course, affirmative and negative outputs can be presented in any appropriate form that convey information, and can be presented to the user in any way, not limited to the user interface of FIG. 5.

The affirmative or negative output may be provided in dependence on one or more of: the vehicle 10 entering a key-on state; a departure location; a pre-determined time of departure of the vehicle 10; or a pre-determined time of day.

The controller 210 may be configured to detect that the vehicle 10 has entered a key-on state using the key-on/key-off monitor 270, and to provide the affirmative or negative output in dependence on the detection. It would be beneficial to ensure that an affirmative or negative output is presented within less than a minute (preferably less than 30 seconds or less than 10 seconds) of the vehicle 10 entering a key-on state, or at least before the vehicle 10 travels a pre-determined distance (e.g. value less than 1 kilometre, less than 100 metres, or less than 10 metres) from a location at which the vehicle entered its current key-on state, such as when the vehicle 10 crosses a geofence (e.g. 100 metres) enclosing an area within which the vehicle 10 entered the key-on state. This gives the user a chance to abort their journey early if necessary.

The departure location may be defined as the location at which the vehicle 10 entered its current key-on state, as described above. Alternatively or additionally, the departure location may be programmed as a departure location (starting location for a route) in the navigation system 290. The departure location may be a default location set by the user or determined from the routine. The departure location may be a location at which the vehicle 10 has been left in its key-off state for at least a pre-determined period of time.

The vehicle 10 may be determined to have left the departure location when the pre-determined time elapses and/or when the vehicle 10 has travelled the pre-determined distance, e.g. exiting the geofence. This causes the affirmative or negative output to be provided.

Optionally, the affirmative or negative output may be provided in association with a first departure of the vehicle 10 for a day (e.g. according to the routine), and not provided for subsequent departures of the vehicle 10 that day.

The predetermined departure time may be stored in the navigation system 290 or otherwise known to the vehicle. The affirmative or negative output may be provided at a preset time before or after the predetermined departure time.

The predetermined time of day may be routine-dependent. The predetermined time of day may be without knowledge of the departure time and/or location of the vehicle 10. The predetermined time of day may be in advance of a putative time of use of the vehicle 10 according to the routine. For example, if the user regularly departs on a journey at 8 am, the predetermined time of day may be a certain time before the regular departure time, such as 7 am. The affirmative or negative output may be provided at a predetermined time of morning, if not routine dependent, before the user is likely to have commenced a journey.

If the affirmative or negative output is provided before the departure time, it may be output on a display of a user's portable user device (e.g. mobile telephone), via a software application. Therefore, the user does not have to be in the vehicle 10. Optionally, the portable user device display may be used as well as or instead of the vehicle output device 300, after the departure of the vehicle 10. This improves security.

The interface of FIG. 5 also includes an indication 53 of the current SoC of the battery 11, and an indication 54 of a charging location, to which the user may assign a tag such as 'home', 'work', etc.

Location information can be employed for advantageous purposes in various aspects and embodiments of the invention.

In some, but not necessarily all examples, the controller 210 is configured to determine and store locations at which the vehicle 10 is charged, for various predictive models associated with the routine. In one implementation, the controller 210 uses data from the navigation system 290 for this purpose. The controller 210 could be configured to record the location at geographical co-ordinate granularity, and/or at geographical area granularity.

For location recording at geographical area granularity, the controller 210 could be configured to cluster geographical data into geographical areas, wherein if the vehicle 10 is in a particular geographical area during charging, the area can be correlated with the vehicle having been charged in that area. Even if the user occasionally charges the vehicle 10 at home and occasionally at a charging location a short distance away from their home, the controller 210 would be able to equate both charging stations with 'home' if they are within a same area.

By determining the location of the vehicle 10 during charging, the controller 210 is able to remember 'preferred' user locations for charging. By recording the times at which the vehicle 10 is charged while at the determined location, the controller 210 is able to remember 'preferred' user times for charging.

Figure 4:
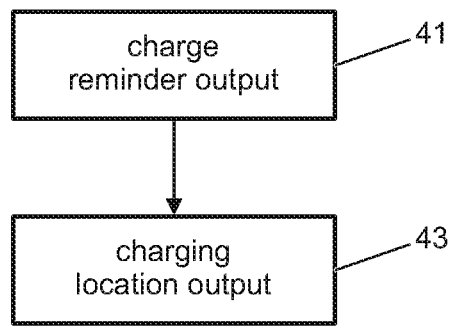
FIG. 4 illustrates another example of a method.

This preferred location/time information can be used as part of a continuation of method 30 as shown in FIG. 4, for reducing the chance of the user ever having to charge their vehicle 10 at an inconvenient time and/or place. Charge reminder outputs can be provided to direct the user to charge at 'preferred' user locations if block 35 determines an out-of-routine charging requirement. An out-of-routine charging requirement refers to a requirement to charge at a non-preferred location, and/or at a non-preferred time.

The method blocks 41 and 43 of FIG. 4 follow from at least blocks 31, 33 and 35 (optionally from block 37) of the method 30 of FIG. 3. The controller 210 could be configured to perform blocks 41 and 43. Block 41 comprises providing a charge reminder output recommending charging of the battery 11, in dependence on the prediction of block 33 indicating that the next charge-depleted state of the battery 11 is expected to occur at a non-preferred time and/or at a non-preferred location. The charge reminder output may be provided to the output device 300 for presentation to the user.

In an example implementation, the non-preferred time could be a time in which, or a time interval within which, according to the determined routine any one or more of the following conditions are met:
 a) The vehicle 10 has never previously been charged;
 b) The vehicle 10 has been charged on fewer than a threshold number of occasions;
 c) The vehicle 10 has only been left in a key-off state for less than a threshold time suitable for charging; and/or
 d) The user has made a 'blacklist' input via a human-machine interface (e.g. 320) to indicate non-preference;

The non-preferred location could be a location at which, according to the determined routine, one or more of the above conditions a), b), c) or d) are met. If one or more of the conditions a) to d) are not met, the location may be a preferred location.

Another location-based condition e) is dependent on charging stations at the location. For example, if there are no charging stations at the location, or charging stations are rarely available, or they are user-blacklisted, the condition e) may be met In an example implementation, the method comprises controlling when the charge reminder output is provided, so that the charge reminder output is provided upon detection of the vehicle 10 approaching a preferred user location for charging and/or a preferred user time for charging. The approach may be detected by detecting the vehicle 10 crossing a geofence, based on data from the navigation system 290.

Using an illustrative example, as the user approaches home they will receive a charge reminder output indicating that they should charge overnight to avoid having to use a motorway charging station on their way back home from a routine journey the next day. It is beneficial for the user to receive the reminder before they have left the vehicle 10.

In some, but not necessarily all examples, the charge reminder output may be presented as an audible output. In other examples the charge reminder output is additionally or instead presented visually.

Block 43 comprises providing a charging location output indicative of a plurality of charging locations within a threshold proximity of a destination of the vehicle 10. This enables the user to select a most appropriate or relevant charging location.

Further to block 43, the controller 210 could be configured to recommend not only charging locations preferred by the user, but also new charging locations which have not been previously used by the user.

It is advantageous to provide a charging location output after or in conjunction with the charge reminder output, because following the reminder the user is likely to be considering charging the vehicle 10.

It would be advantageous for similar reasons to provide a charging location output in conjunction with the above-described negative output indicating a need to charge. However, it should be appreciated that a charging location output could be provided at any time for informative purposes.

The charging location output indicates a subset of a plurality of known charging locations, known to the controller 210. In some examples, the plurality of known charging locations includes charging locations known from a service for providing access to a database of charging infrastructure. The plurality of known charging locations may also include charging locations known from machine learning based on the determined routine and location information from the navigation system 290 (at location X, the SoC is routinely increased to 100%, therefore location X comprises a charging location).

In some, but not necessarily all examples, a determination can be made of which known charging locations to indicate using the charging location output. For example, the navigation system 290 can provide an indication of a current destination of the vehicle 10, such as "home" or "work", and the charging location output will only indicate nearby charging locations satisfying a condition associated with their proximity to the current destination.

Alternatively or in addition, the selection of which charging locations to indicate using the charging location output can be made in dependence on any one or more properties selected from the list:
i. charger type;
ii. charger compatibility;
iii. availability of the charger;
iv. charge rate of the charger;
v. cost to charge using the charger;
vi. data indicating that the user or the vehicle 10 is authorized to use the charger;
vii. a user-assigned preference; or
viii. whether the charger has been used before.

In some, but not necessarily all examples the properties may each be associated with a score. Each charging location has a score associated with the scores of its combined properties. Only the charging locations with the highest scores are indicated.

In some, but not necessarily all examples the score of a property is adjusted by a current context of the vehicle 10. For example: the score of property "ii" may be weighted to account for the known compatibility of the vehicle 10 with certain chargers; the score of property "iv" may be weighted by how long the vehicle 10 is expected to remain key-off upon arrival at the current destination, based on the routine; the score of properties "iii" and "v" may be weighted by a current time of day; and the score of the property "vi" may be weighted by a known user of the vehicle 10.

The charging locations for the charging location output may be selected so that at least one regularly used charging location is displayed, and at least one never-previously-used 'better' charging location is displayed, which may for example have a better score or weighted score than the regularly used charging location. This enables the user to discover more appropriate or useful charging locations.

Figure 6:
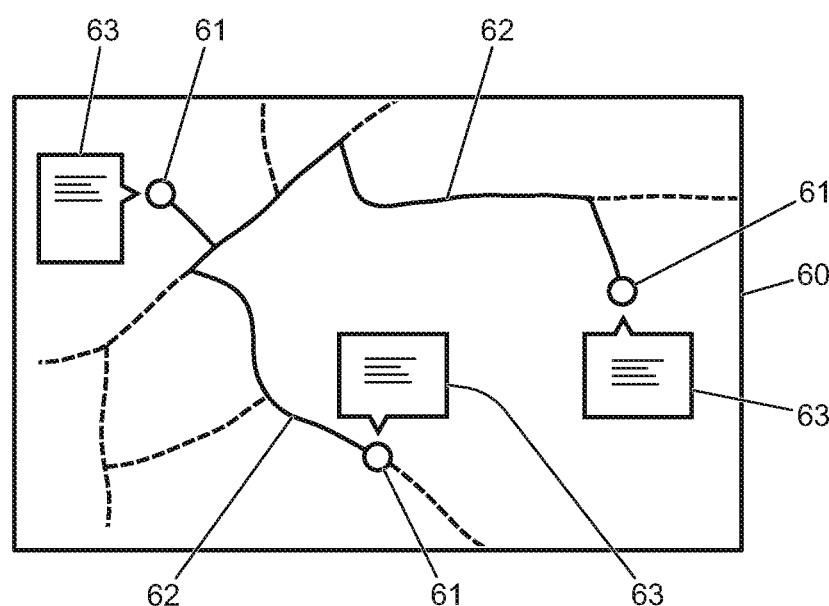
FIG. 6 illustrates another example of a user interface.

In one illustrative example shown in FIG. 6, the charging location output takes the form of a user interface 60 showing a map, with the charging locations highlighted as points of interest using markers 61. Route lines 62 may be displayed to indicate directions to the charging locations. Properties of the charging locations may be displayed as text boxes 63 proximal to the respective markers of the charging locations.

It would be beneficial, but not essential, to ensure that a charging location output of block 43 follows from the charge reminder output of block 41 to ensure that the charging locations are indicated to the user while the vehicle 10 approaches a preferred user location for charging and/or a preferred user time for charging. In some examples, blocks 41 and 43 can be performed independently from each other and in any order.

In some, but not necessarily all examples, the charging location output and/or the charge reminder output is inhibited in dependence on a determination that the vehicle 10 is approaching a location and/or time when the vehicle 10 is expected to be left key-off, according to the routine, for only a short duration of time (e.g. less than a threshold duration such as one hour). This reduces the chance of nuisance alerts being provided.

The blocks illustrated in FIGS. 3 and 4 may represent steps in a method and/or sections of code in the computer program 240. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example the energy storage means could be other than a traction battery 11 for an electric vehicle. References to a state of charge/charge could be references to the quantity of energy stored in the energy storage means for conversion into torque for producing tractive force.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method for determining a charging requirement for an energy storage means of a vehicle, the method comprising:
    determining a routine of use of charge of the energy storage means;
    predicting what the state of charge of the energy storage means will be at completion of an event based on the routine, wherein the event is one or more of: a defined time period of future driving of the vehicle; or a defined distance of future driving of the vehicle;
    determining a charging requirement for the energy storage means based on the prediction;
    providing an output to a user of the vehicle indicative of a time at which an increase in the state of charge of the energy storage means will be required based on the determined charging requirement; and
    providing an affirmative or negative output to the user based on the determined charging requirement,
    wherein the affirmative output indicates that an increase in the state of charge of the energy storage means will not be required for completing the event based on the predicted state of charge at completion of the event not being in a charge-depleted state,
    wherein the negative output indicates that an increase in the state of charge of the energy storage means will be required for completing the event based on the predicted state of charge at completion of the event being in a charge-depleted state, and
    wherein when the affirmative or negative output is provided based on one or more of: the vehicle entering a key-on state; a departure location; a pre-determined departure time; or a pre-determined time of day.

2. The method as claimed in claim 1, wherein the providing an affirmative or negative output includes providing the affirmative output.

3. The method as claimed in claim 2, further comprising providing the affirmative output within a predetermined period of time of the vehicle leaving the departure location, within a predetermined distance from the departure location, or a combination thereof.

4. The method as claimed in claim 1, wherein the providing an affirmative or negative output includes providing the negative output.

5. The method as claimed in claim 4, further comprising providing the negative output within a predetermined period of time of the vehicle leaving the departure location, within a predetermined distance from the departure location, or a combination thereof.

6. The method as claimed in claim 1, wherein the affirmative or negative output is provided to a portable user device.

7. The method as claimed in claim 6, wherein the affirmative or negative output is provided to the portable user device before the pre-determined departure time or at the pre-determined time of day.

8. The method as claimed in claim 1, wherein the output indicative of a time indicates a day on which an increase in the state of charge of the energy storage means will be required.

9. The method as claimed in claim 1, wherein the routine is determined using measurements of the state of charge of the energy storage means recorded with respect to a cyclic calendar-based time interval.

10. The method as claimed in claim 1, further comprising providing a charge reminder output recommending charging of the energy storage means based on the prediction indicating that the state of charge of the energy storage means will be in a charge depleted state at either or both a time when and a place where the vehicle is not routinely charged.

11. The method as claimed in claim 10, further comprising providing the charge reminder output upon detection of the vehicle approaching a location where the energy storage means has previously been charged, where the vehicle has previously been left in a key-off state for longer than a predetermined threshold length of time, or a combination thereof.

12. The method as claimed in claim 1, further comprising providing a charging location output indicative of one or more charging locations within a threshold proximity of a destination of the vehicle.

13. The method as claimed in claim 12, wherein the charging location output is indicative of at least one charging location where the energy storage means has not previously been charged, based on the at least one charging location being associated with one or more of the following properties:
   charger type;
   charger compatibility;
   availability of the charger;
   charge rate of the charger;
   cost to charge using the charger;
   data indicating that the user or the vehicle is authorised to use the charger; or
   a user-assigned preference.

14. A controller comprising at least one electronic processor; and at least one electronic memory device electrically coupled to the electronic processor and having instructions stored therein, the at least one electronic memory device and the instructions configured to, with the at least one electronic processor, cause a vehicle system at least to perform a method for determining a charging requirement for an energy storage means of a vehicle, the method comprising:
   determining a routine of use of charge of the energy storage means;
   predicting what the state of charge of the energy storage means will be at completion of an event based on the routine, wherein the event is one or more of: a defined time period of future driving of the vehicle; a defined distance of future driving of the vehicle;
   determining a charging requirement for the energy storage means based on the prediction;
   providing an output to a user of the vehicle indicative of a time at which an increase in the state of charge of the energy storage means will be required based on the determined charging requirement; and
   providing an affirmative or negative output to the user based on the determined charging requirement,
   wherein the affirmative output indicates that an increase in the state of charge of the energy storage means will not be required for completing the event based on the predicted state of charge at completion of the event not being in a charge-depleted state,
   wherein the negative output indicates that an increase in the state of charge of the energy storage means will be required for completing the event based on the predicted state of charge at completion of the event being in a charge-depleted state, and
   wherein when the affirmative or negative output is provided is based on one or more of: the vehicle entering a key-on state; a departure location; a pre-determined departure time; or a pre-determined time of day.

15. The controller of claim 14, wherein the at least one electronic memory device and the instructions are further configured to, with the at least one electronic processor, cause the vehicle system to provide the affirmative output.

16. The controller of claim 15, wherein the at least one electronic memory device and the instructions are further configured to, with the at least one electronic processor, cause the vehicle system to provide the affirmative output within a predetermined period of time from the vehicle leaving the departure location and/or within a predetermined distance from the departure location.

17. The controller of claim 14, wherein the affirmative or negative output is provided to a portable user device.

18. A vehicle system comprising the controller of claim 14 and at least one output device, wherein the output device is configured to receive the provided output and to present the output to a user.

19. A vehicle comprising the controller of claim 14.

20. A non-transitory computer readable medium having instructions stored therein that, when run on at least one electronic processor, cause a controller to perform a method for determining a charging requirement for an energy storage means of a vehicle, the method comprising:
   determining a routine of use of charge of the energy storage means;
   predicting what the state of charge of the energy storage means will be at completion of an event based on the routine, wherein the event is one or more of: a defined time period of future driving of the vehicle; or a defined distance of future driving of the vehicle;
   determining a charging requirement for the energy storage means based on the prediction;
   providing an output to a user of the vehicle indicative of a time at which an increase in the state of charge of the energy storage means will be required based on the determined charging requirement; and
   providing an affirmative or negative output to the user based on the determined charging requirement,
   wherein the affirmative output indicates that an increase in the state of charge of the energy storage means will not be required for completing the event based on the predicted state of charge at completion of the event not being in a charge-depleted state, wherein the negative output indicates that an increase in the state of charge of the energy storage means will be required for completing the event based on the predicted state of charge at completion of the event being in a charge-depleted state, and wherein when the affirmative or negative output is provided is based on one or more of: the vehicle entering a key-on state; a departure location; a pre-determined departure time; or a pre-determined time of day.

* * * * *